(12) United States Patent
Kiyono et al.

(10) Patent No.: US 7,688,537 B2
(45) Date of Patent: Mar. 30, 2010

(54) THIN-FILM MAGNETIC HEAD WITH HEATING ELEMENT FOR ADJUSTING MAGNETIC SPACING AND CONTROL METHOD OF MAGNETIC SPACING

(75) Inventors: Hiroshi Kiyono, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 1224 days.

(21) Appl. No.: 11/231,902

(22) Filed: Sep. 22, 2005

(65) Prior Publication Data

US 2006/0103981 A1    May 18, 2006

(30) Foreign Application Priority Data

Nov. 10, 2004  (JP) .............................. 2004-326344

(51) Int. Cl.
*G11B 21/02*   (2006.01)
*G11B 5/127*   (2006.01)

(52) U.S. Cl. .................................... 360/75; 360/125.31
(58) Field of Classification Search ........................ None
See application file for complete search history.

(56) References Cited

U.S. PATENT DOCUMENTS 5,991,113 A    11/1999  Meyer et al.
7,133,254 B2 *  11/2006  Hamann et al. ........ 360/125.74

2003/0099054 A1  5/2003  Kamijima
2003/0174430 A1  9/2003  Takahashi et al.
2005/0018347 A1 * 1/2005  Hsiao et al. ................. 360/128
2005/0057841 A1 * 3/2005  Stover et al. .................. 360/59

FOREIGN PATENT DOCUMENTS

| JP | 04-305809 | 10/1992 |
|----|-----------|---------|
| JP | 5-20635 | 1/1993 |
| JP | 2003-168274 | 6/2003 |
| JP | 2004-110976 | 4/2004 |
| JP | 2004-288290 | 10/2004 |
| JP | 2005-11413 | 1/2005 |

OTHER PUBLICATIONS

U.S. Appl. No. 11/683,587, filed Mar. 8, 2007, Kurihara, et al.

* cited by examiner

*Primary Examiner*—Andrew L Sniezek
(74) *Attorney, Agent, or Firm*—Oblon, Spivak, McClelland, Maier & Neustadt, L.L.P.

(57) ABSTRACT

A thin-film magnetic head that the protrusion response of the write head element due to the heat generated from the heating element can be set to the same level as that due to the heat generated from the write coil layer in order to adequately resolve the deficiency in the writing performance during the starting period of writing, is provided. The head comprises: at least one write head element including a magnetic pole layer; and at least one first heating element generating a heat to expand the at least one write head element thermally, the at least one first heating element being contacted with the magnetic pole layer.

5 Claims, 15 Drawing Sheets

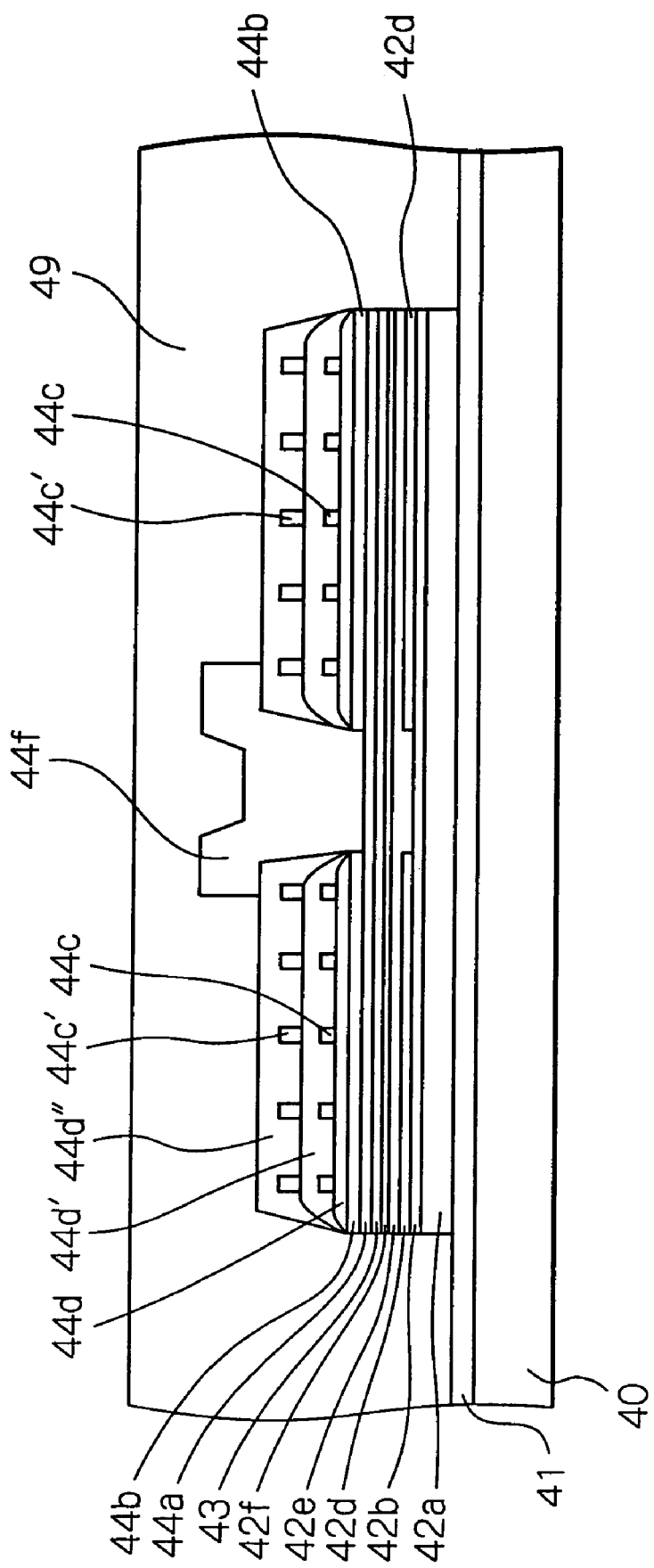

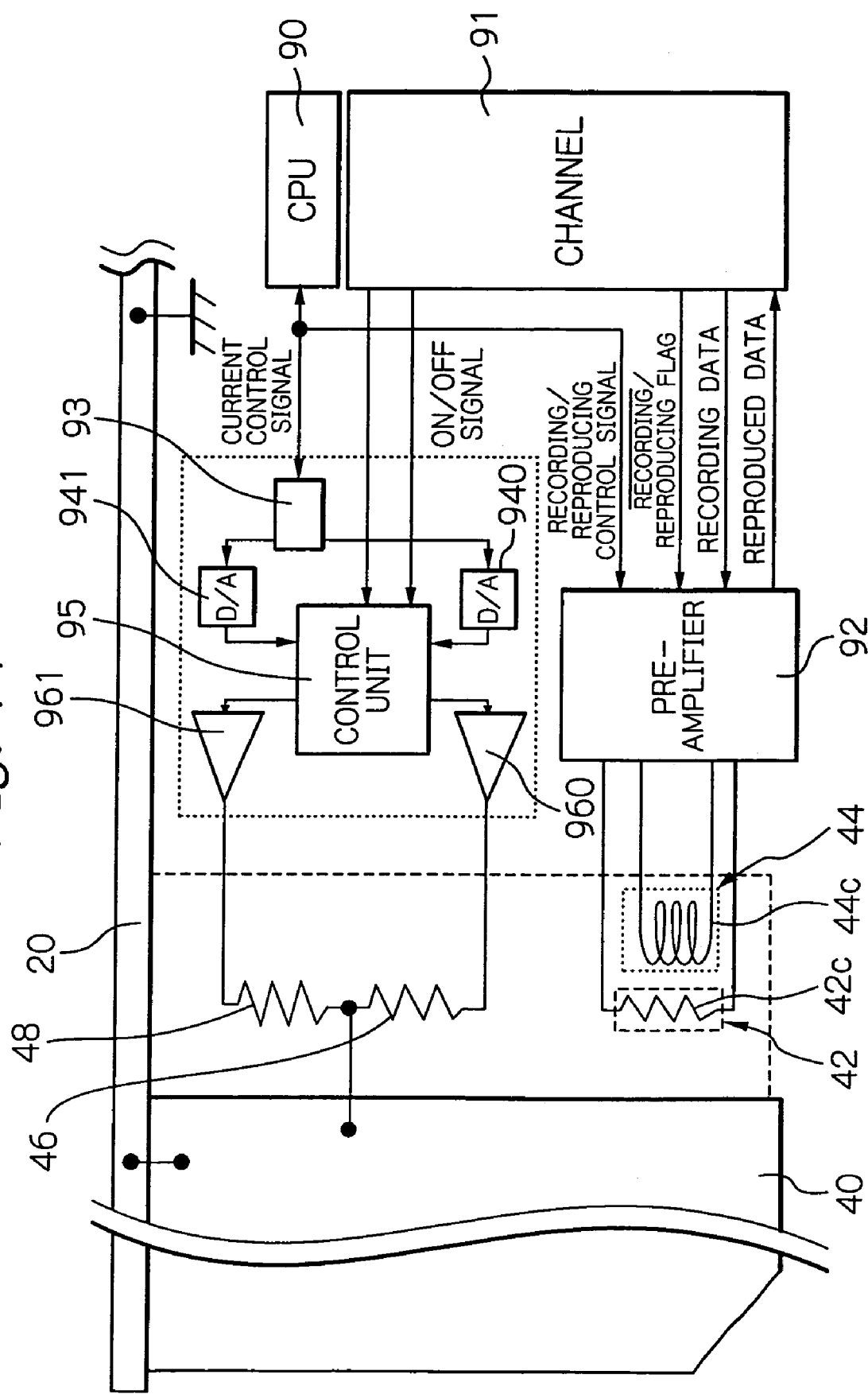

THIN-FILM MAGNETIC HEAD WITH HEATING ELEMENT FOR ADJUSTING MAGNETIC SPACING AND CONTROL METHOD OF MAGNETIC SPACING

PRIORITY CLAIM

This application claims priority from Japanese patent application No. 2004-326344, filed on Nov. 10, 2004, which is incorporated herein by reference.

BACKGROUND OF THE INVENTION

1. Field of the Invention

The present invention relates to a thin-film magnetic head with a heating element, a head gimbal assembly (HGA) with the thin-film magnetic head and a magnetic disk drive apparatus with the HGA, and to a method for controlling a magnetic spacing during writing data in the magnetic disk drive apparatus.

2. Description of the Related Art

In a magnetic disk drive apparatus, when writing or reading signals, a thin-film magnetic head hydrodynamically flies with a predetermined spacing (flying height) on a rotating magnetic disk. While flying on the magnetic disk, the thin-film magnetic head writes signals to the magnetic disk using magnetic fields generated from an inductive write head element, and reads signals by sensing magnetic fields corresponding to the signals from the magnetic disk with use of an magnetoresistive (MR) effect read head element. On these cases, a magnetic spacing $d_{MS}$ is defined as the effective magnetic distance between ends of these magnetic head elements and the surface of the magnetic disk.

With higher recording density due to the increasing data storage capacity and the miniaturization of the magnetic disk drive apparatus in recent years, a track width of the thin-film magnetic head is becoming smaller. In order to avoid the degradation of the writing and reading performance due to the smaller track width, latest magnetic disk drive apparatuses actually have the magnetic spacing $d_{MS}$ reduced down to the order of 10 nm. In the case, some techniques are proposed, which controls the smaller the $d_{MS}$ with some accuracy by positively utilizing a thermal pole tip protrusion (TPTP) phenomenon with the use of a heater provided near or inside the magnetic head element, for example, in U.S. Pat. No. 5,991,113, US Patent Publications Nos. 2003/0174430 A1 and 2003/0099054 A1, and Japanese Patent Publication No. 05-020635A.

However, in the thin-film magnetic head with the above-mentioned heater, a problem has been occurring, which the deficiency in the writing performance during the starting period of writing can not be adequately dealt with.

The TPTP phenomenon is inherent in the inductive write head element that is protruded toward the magnetic disk surface by thermal expansion due to a Joule heat and an eddy-current loss heat. In the inherent case, this protrusion begins as soon as writing, and the magnetic spacing $d_{MS}$ decreases during a predetermined period, then, settles down to a predetermined value. That is to say, during this predetermined period, because the magnetic spacing $d_{MS}$ is larger than this predetermined value, the writing performance becomes deficient. Therefore, in the front region of the sector that signals were written under the deficient writing performance, a reading error is likely to occur. Even if the heater described in the above-mentioned U.S. patent documents is used to protrude the write head element prior to writing, an enough protrusion can not be generated timely at the start of writing because the response of the protrusion due to the heat generated from the heater is rather slow.

Meanwhile, by using the thin-film resistor described in Japanese Patent Publication No. 05-020635A, which is formed between the upper and lower magnetic pole layers as well as the thin-film coil is, the protrusion response due to the heat generated from the thin-film resistor can be set to the same level as that due to the heat generated from the thin-film coil. In the case, however, a magnetic flux induced by the current flowing through the thin-film resistor reaches the magnetic disk surface via the magnetic pole layers, and causes an unwanted writing. By the unwanted writing, a writing error is likely to occur during the starting period of writing.

BRIEF SUMMARY OF THE INVENTION

Therefore, it is an object of the present invention to provide a thin-film magnetic head that the protrusion response of the inductive write head element due to the heat generated from the heating element can be set to the same level as that due to the heat generated from the write coil layer, to adequately resolve the deficiency in the writing performance during the starting period of writing, an HGA provided with this thin-film magnetic head and a magnetic disk drive apparatus provided with this HGA. And it is another object of the present invention to provide the method for controlling the magnetic spacing $d_{MS}$, by which the problem of the deficiency in the writing performance during the starting period of writing can be solved.

Here, some terms will be defined before explaining the present invention. In a layered structure of the magnetic head elements formed on an element-formed surface of a slider substrate, a component that is closer to the slider substrate than a standard layer is defined to be "below" or "lower" in relation to the standard layer, and a component that is in the stacked direction side of the standard layer is defined to be "above" or "upper" in relation to the standard layer.

According to the present invention, a thin-film magnetic head is provided, which comprises: at least one write head element including a magnetic pole layer; and at least one first heating element generating a heat to expand the at least one write head element thermally, the at least one first heating element being contacted with the magnetic pole layer. In the case, the whole or a portion of the at least one first heating element preferably has surface contact with a portion of the magnetic pole layer.

According to the present invention, a thin-film magnetic head is further provided, which comprises: at least one write head element including a magnetic pole layer; and at least one first heating element generating a heat to expand the at least one write head element thermally, the at least one first heating element being connected with the magnetic pole layer through at least one thermal conductive layer.

As described above, because the first heating element is contacted with, has surface contact with, or is connected through the thermal conductive layer with the magnetic pole layer, the heat generated from the first heating layer reaches the write head element sufficiently with high efficiency. As the result, the protrusion response that is a time required for the amount of the protrusion of the magnetic pole layer due to the heat generated from the first heating element to become a predetermined value, can be set to the same level as the protrusion response due to the heat generated from the coil layer of the write head element. Therefore, the magnetic spacing $d_{MS}$ can be set down to a predetermined value just before the start of writing data, by heating the write head element as well as the magnetic pole layer in advance, with the use of the first heating element. Consequently, the problem of the deficiency in the writing performance during the starting period of writing due to the larger magnetic spacing $d_{MS}$ than the setting value, can be solved, which could not have been avoided by means of the conventional art.

Preferably, the at least one first heating element is provided in a position opposite to an ABS in relation to the magnetic pole layer.

Further, the magnetic pole layer is preferably a lower magnetic pole layer. Usually, the write head element is an inductive write head element that has upper and lower magnetic pole layers sandwiching the coil layer, and the lower magnetic pole layer has the furthest end from the ABS in the inductive write head element. Therefore, the first heating element is accordingly provided in a position far enough from the ABS, and the thermal influence to the read head element can be suppressed to a predetermined degree.

More preferably, the at least one second heating element is provided in a position opposite to an ABS in relation to the at least one write head element, and an insulating layer is further provided to be interposed between the at least one second heating element and the at least one write head element.

The second heating element heats the write and read head elements through the insulating layer. Therefore, the protrusion response of these head elements by the second heating element usually becomes about one order of magnitude smaller than the response by the first heating element. However, the heat generated from the second heating element does not raise the temperature of the read head element, especially the MR read head element, so much, and does not have a damaging influence on the life time of the read head element. Therefore, the second heating element can be used for continuously controlling the magnetic spacing $d_{MS}$ during the whole write and read operations, which dose not need high response.

Further, preferably, the at least one first heating element and/or the at least one second heating element is connected to the magnetic pole layer electrically, and the magnetic pole layer is grounded.

According to the present invention, a HGA is further provided, which comprises the above-described thin-film magnetic head and trace conductors for supplying currents to the at least one first heating element. Preferably, the HGA further comprises trace conductors for supplying currents to the at least one second heating element when the at least one second heating element is provided.

According to the present invention, a magnetic disk drive apparatus is further provided, which comprises above-mentioned at least one HGA and a heater-current control means for controlling currents supplied to the at least one first heating element. Preferably, the heater-current control means also controls currents supplied to the at least one second heating element when the at least one second heating element is provided.

The heater-current control means preferably has a system using heating-element control signals which controls currents supplied to the at least one first heating element, independently from the recording/reproducing control signal system. Preferably, the system using heating-element control signals also controls currents supplied to the at least one second heating element when the at least one second heating element is provided.

According to the present invention, A control method of a magnetic spacing during write operation in magnetic recording is further provided, which comprises the step of applying a current before a start of writing data to at least one first heating element that is contacted with a magnetic pole layer included by at least one write head element, or is connected with the magnetic pole layer through at least one thermal conductive layer, for protruding the at least one write head element due to thermal expansion.

In the method, the current preferably begins to be applied at a time predetermined period prior to the start of writing data, and a step of finishing applying the current at the start of writing data is preferably comprised, for maintaining a constant value of a magnetic spacing after the start of writing data.

Further, preferably, an electric power supplied to the at least one first heating element has the same level as an electric power supplied to a coil layer included by the at least one write head element during writing data, and the predetermined period is equivalent to a time period between the start of writing data at which the electric power begins to be supplied to the coil layer and a time at which the magnetic spacing just reaches the constant value.

Preferably, the method further comprises a step of applying a current in advance of writing or reading data to at least one second heating element that is positioned opposite to an ABS in relation to the at least one write head element, and through the interposition of an insulating layer provided between the at least one second heating element and the at least one write head element.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 6 shows a cross-sectional view taken along line B-B shown in FIG. 4 illustrating a structure of the thin-film magnetic head according to the embodiment shown in FIG. 4;

FIG. 11 shows a block diagram illustrating the circuit structure of the recording/reproducing circuit of the magnetic disk drive apparatus according to the embodiment shown in FIG. 1;

DETAILED DESCRIPTION OF THE INVENTION

Figure 1:
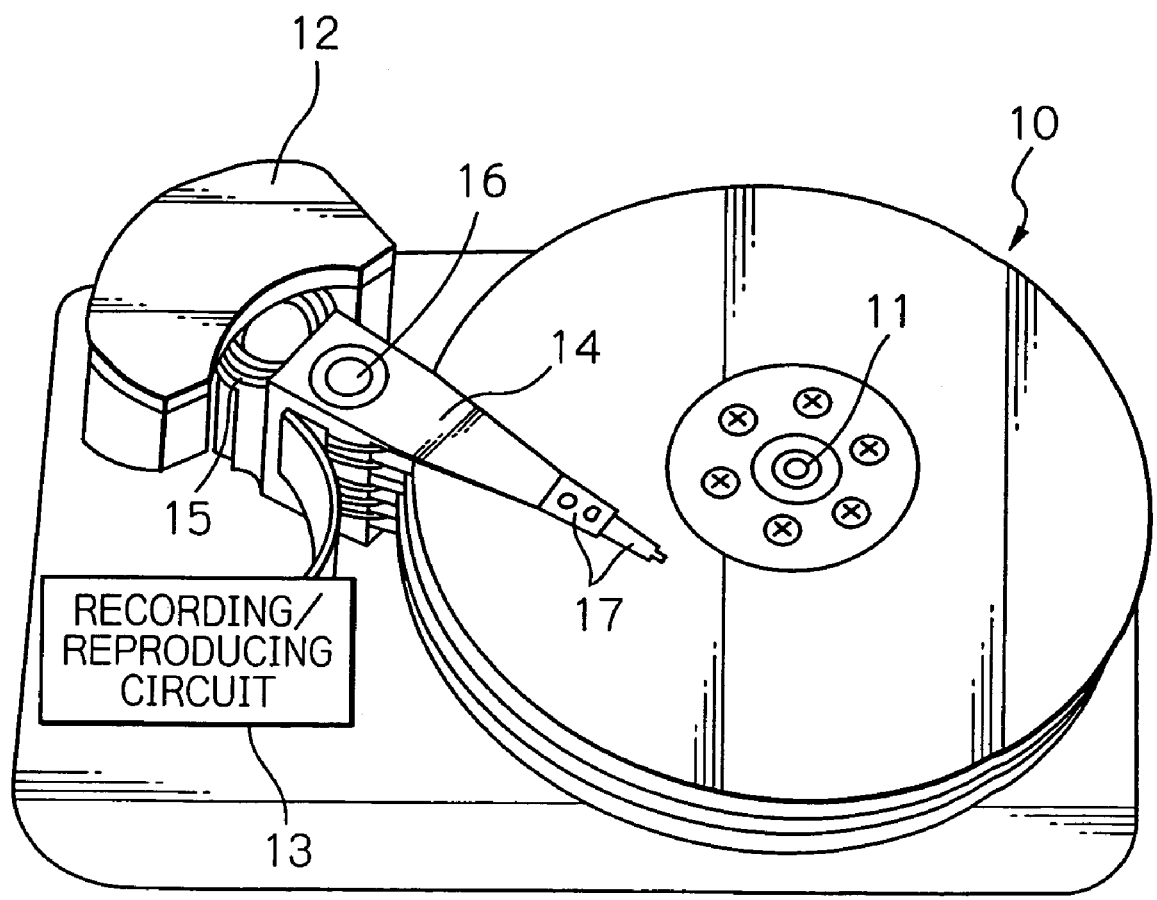
FIG. 1 shows a perspective view schematically illustrating a structure of a main part of an embodiment of a magnetic disk drive apparatus according to the present invention.
Figure 2:
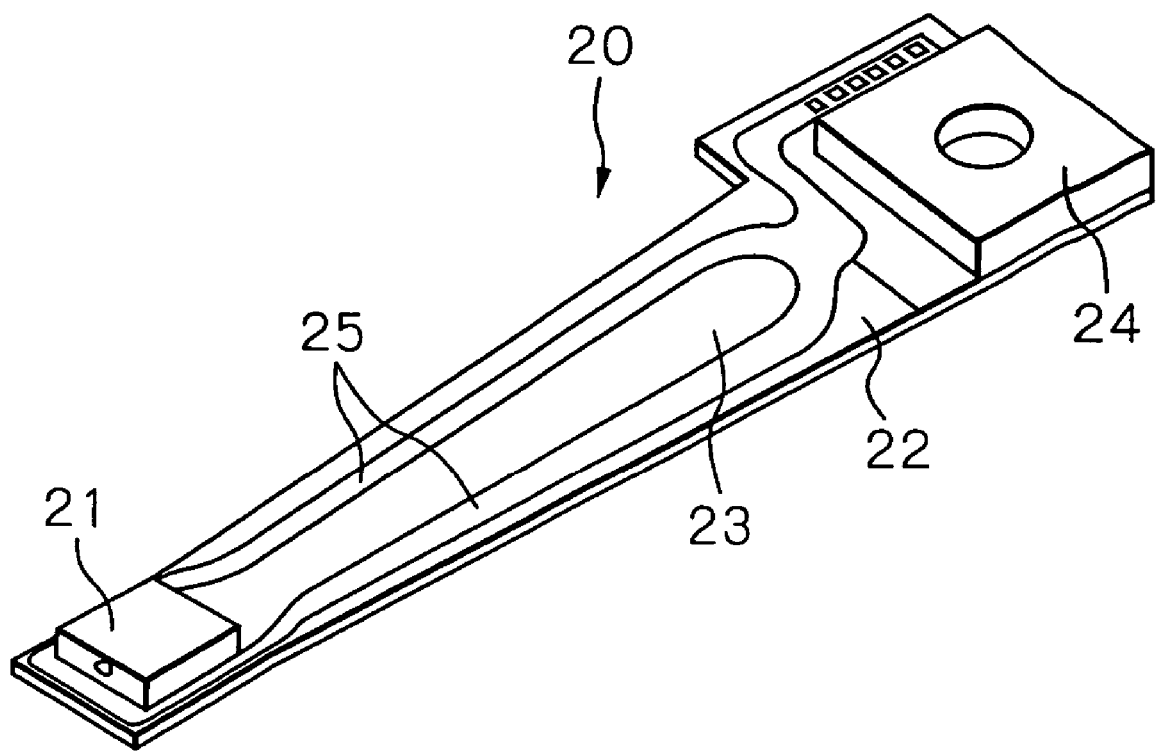
FIG. 2 shows a perspective view illustrating an embodiment of an HGA according to the present invention.
Figure 3:
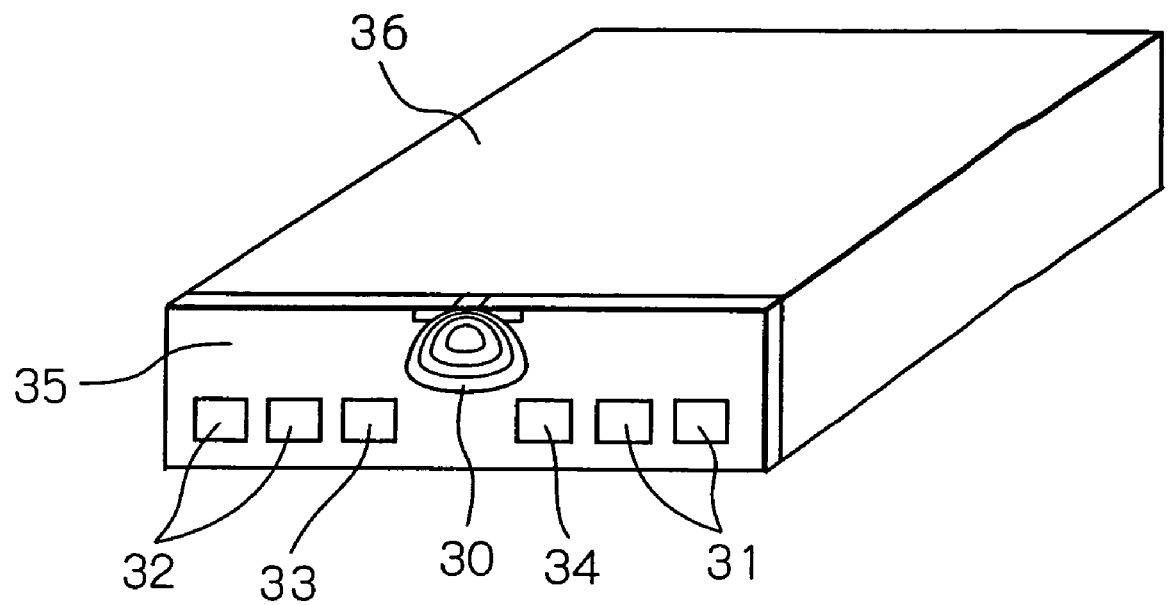
FIG. 3 shows a perspective view of an embodiment of a thin-film magnetic head provided on the end portion of the HGA.

FIG. 1 shows a perspective view schematically illustrating a structure of a main part of an embodiment of a magnetic disk drive apparatus according to the present invention, FIG. 2 shows a perspective view illustrating an embodiment of an HGA according to the present invention, and FIG. 3 shows a perspective view of an embodiment of a thin-film magnetic head (slider) provided on the end portion of the HGA.

In FIG. 1, reference numeral 10 indicates a plurality of magnetic disks rotating around a rotational axis of a spindle motor 11, 12 indicates an assembly carriage device for positioning a thin-film magnetic head (slider) on a track, and 13 indicates a recording/reproducing circuit for controlling read/write operations and heat operations of the thin-film magnetic head, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider is mounted on each HGA 17 in such a way as to face the surface of each magnetic disk 10. The each number of the magnetic disks 10, the drive arms 14, the HGAs 17 and the thin-film magnetic heads (sliders) can also be only one.

As shown in FIG. 2, the HGA is constructed by fixing a slider 21 having magnetic head elements on an end portion of a suspension 20 and by electrically connecting one end of a wiring member 25 to signal electrodes of the slider 21.

The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23.

It is obvious that the suspension structure of the HGA according to the present invention is not limited to the above-described structure. Though not shown in the figure, it is also possible to attach a head drive IC chip at some midpoint of the suspension 20.

As shown in FIG. 3, the thin-film magnetic head (slider) according to the present embodiment is provided with an inductive write head element and an MR read head element 30, total of four signal electrodes 31 and 32 connected to these elements, and total of two drive electrodes 33 and 34 for flowing currents through a first heating element and a second heating element that are not shown in FIG. 3, all of which are formed on an element-formed surface 35. Reference numeral 36 indicates an air bearing surface (ABS) of the slider. The number and positions of the electrodes are not limited to the mode in FIG. 3. In the embodiment shown in FIG. 3, as to be mentioned later, opposite electrodes of the first and second heating elements to their drive electrodes are grounded via the slider substrate, however it is also possible that the opposite electrodes are formed on the element-formed surface 35, and are not grounded. In the case, the number of the electrodes formed on the element-formed surface 35 becomes eight.

Figure 4:
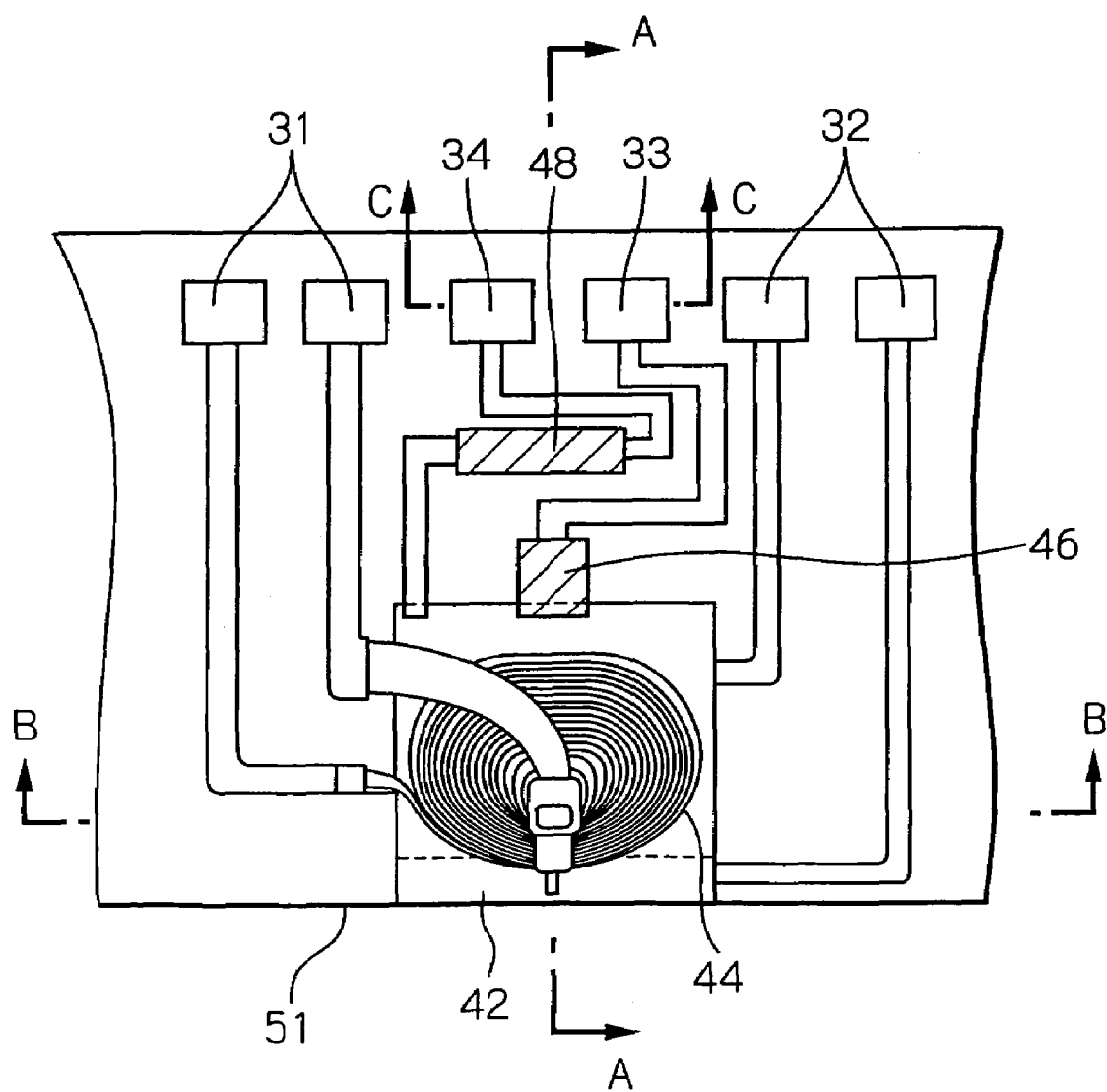
FIG. 4 shows a plain view illustrating an embodiment of the thin-film magnetic head according to the present invention viewed through from the side of the element-formed surface of the slider substrate.
Figure 5A:
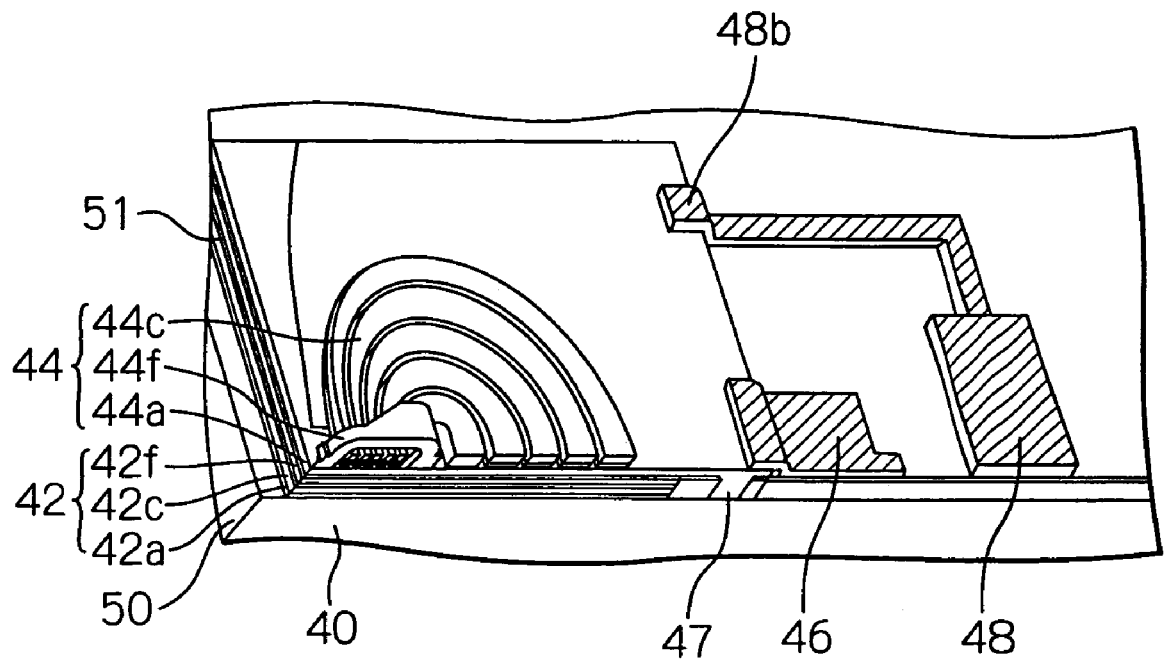
FIGS. 5a and 5b show perspectives view containing a cross-section surface taken along line A-A shown in FIG. 4, and the cross-sectional view taken along the line A-A, respectively.
Figure 5B:
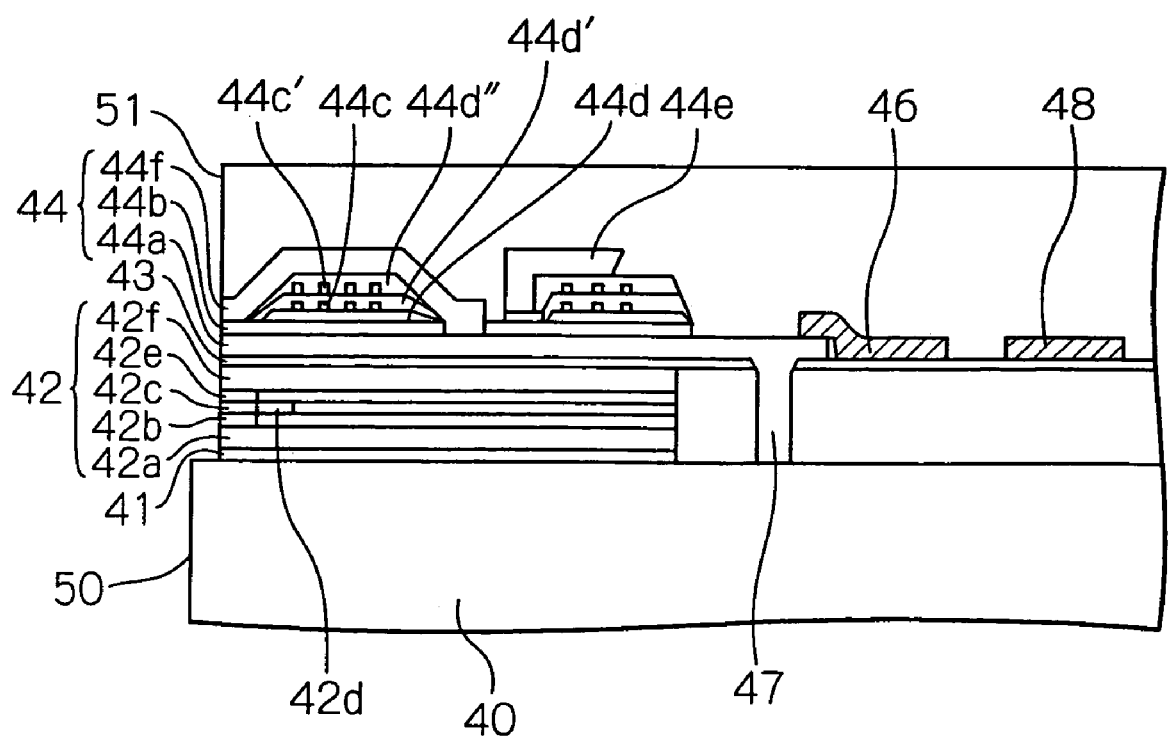

FIG. 4 shows a plain view illustrating an embodiment of the thin-film magnetic head according to the present invention viewed through from the side of the element-formed surface of the slider substrate, FIG. 5a shows a perspective view containing a cross-section surface taken along line A-A shown in FIG. 4, and FIG. 5b shows the cross-sectional view taken along the line A-A. The number of turns of the coil in FIGS. 5a and 5b is shown as if to be smaller than the number of turns in FIG. 4 for simplicity of drawings. The coil may also be a two-layered coil or a helical coil.

In FIG. 4, the two signal electrodes 31 are connected with the inductive write head element 44, and the two signal electrodes 32 are connected with the MR read head element 42. The drive electrode 33 is connected with the first heating layer 46, as the first heating element, provided in a position opposite to the head end surface 51 (opposite to the ABS) in relation to the inductive write head element 44, and the drive electrode 34 is connected with the second heating layer 48, as the second heating element, provided in a position opposite to the head end surface 51 (opposite to the ABS) in relation to the inductive write head element 44 and the first heating layer 46.

In FIG. 5a, the slider substrate 40 has the ABS 50 and flies hydrodynamically over the surface of the rotating magnetic disk with a predetermined space during write and read operations. The MR read head element 42, the inductive write head element 44, the first heating layer 46, and the second heating layer 48 are formed on one side surface (element-formed surface) of the slider substrate 40 when the ABS 50 is set to a bottom.

The MR read head element 42 includes an MR layer 42c, a lower shield layer 42a and an upper shield layer 42f disposed in positions sandwiching the MR layer 42c. The MR layer 42c includes a current-in-plane giant magnetoresistive (CIP-GMR) multilayer, a current-perpendicular-to-plane giant magnetoresistive (CPP-GMR) multilayer or a tunnel magnetoresistive (TMR) multilayer and senses magnetic fields corresponding to signals with very high sensitivity. When the MR layer 42c includes the CPP-GMR multilayer or the TMR multilayer, the lower shield layer 42a and the upper shield layer 42f act also as a lower electrode and an upper electrode, respectively. The lower shield layer 42a and upper shield layer 42f are magnetic layers and play the role of shielding external magnetic fields that causes noise to the MR layer 42c.

The inductive write head element 44 includes a lower magnetic pole layer 44a, an upper magnetic pole layer 44f and a coil layer 44c. The upper and lower magnetic pole layers 44f and 44a are magnetic paths to converge and guide magnetic flux induced by the current flowing through the coil layer 44c up to the magnetic disk surface onto which data is written. Instead of the upper shield layer 42f and the lower magnetic pole layer 44a, only one magnetic layer may be formed which serves as these layers.

The ends of the MR read head element 42 and the inductive write head element 44 facing the magnetic disk surface extend to the head end surface 51. The head end surface 51 is coated with diamond like carbon (DLC) and so on as a protective film. Here, the magnetically effective distance between the magnetic disk surface and the head end surface 51 around the ends of the read and write head elements during write/read operations corresponds to the magnetic spacing $d_{MS}$.

The first heating layer 46 is formed in a position opposite to the head end surface 51 (opposite to the ABS 50) in relation to the lower magnetic pole layer 44a, and the end portion in the side of the head end surface 51 has surface contact with the end portion of the lower magnetic pole layer 44a by riding on the layer. The first heating layer 46 is formed of an electrical resistor and generates a heat due to a current flowing through itself. Then, by the propagation of the heat, the whole inductive write head element 44 as well as the lower magnetic pole layer 44a is thermally expanded and protruded toward the magnetic disk surface. As the result, the magnetic spacing $d_{MS}$ becomes small. As just described, the magnetic spacing $d_{MS}$ can be fine-adjusted by controlling currents flowing through the first heating layer 46.

In the present embodiment, the first heating layer 46 is separated by a certain distance from the MR read head element 42 whose end reaches head end surface 51. Therefore, it is possible to heat the inductive write head element 46 rather selectively.

Because the first heating layer 46 heats the inductive write head element 44 directly, not through the insulating layer, etc., the protrusion response of the inductive write head element due to the direct heating becomes fast. In fact, the protrusion response becomes the same level as the response of the protrusion due to a heat generated from the coil layer, that is, the original protrusion of TPTP phenomenon. Therefore, as to be described later, the magnetic spacing $d_{MS}$ can be set to the predetermined value timely before the start of writing. Consequently, the problem of the deficiency in the writing performance during the starting period of writing can be solved.

Moreover, the first heating layer 46 and the lower magnetic pole layer 44a are connected electrically, as well as thermally, with each other because of their surface contact, and the lower magnetic pole layer 44a is connected electrically to the slider substrate 40 connected to the ground through a connect portion 47. Therefore, one electrode of the first heating layer 46 is accordingly grounded via the slider substrate 40. Here, the grounding of the lower magnetic pole layer 44a is not limited to the mode using the connect portion 47, and the connect portion 47 is also not limited to the mode shown in FIGS. 5a and 5b. The reliable connection to ground of the lower magnetic pole layer 44a is only required.

Further, the first heating layer 46 may also be isolated electrically from the lower magnetic pole layer 44a. In the case, the first heating layer 46 has two electrodes on the element-formed surface 35. Furthermore, the shape of the first heating layer 46 is not limited to the above-described monolayer mode. Alternatives of the first heating layer will be described later in detail.

The second heating layer 48 is formed in the position opposite to the head end surface 51 (opposite to the ABS 50) in relation to the inductive write head element 44, and separately placed from the inductive write head element 44 by the overcoat layer 49 (not shown in the figure) lied between them. The second heating layer 48, as well as the first heating layer 46, is formed of an electrical resistor and generates a heat due to a current flowing through itself. Then, by the propagation of the heat, the MR read head element 42 and the inductive write head element 44 are thermally expanded and protruded toward the magnetic disk surface. As the result, the magnetic spacing $d_{MS}$ becomes small. Therefore, the magnetic spacing $d_{MS}$ can be fine-adjusted by controlling currents flowing through the second heating layer 48.

However, because the second heating layer 48 indirectly heats the MR read head element 42 and the inductive write head element 44 through the overcoat layer 49 formed of the insulating material, the protrusion response of these head elements due to the indirect heating usually becomes about one order of magnitude smaller than the response by the first heating layer 46. Therefore, the second heating layer 48 is used for controlling the magnetic spacing $d_{MS}$ during the whole write and read operations, not for dealing with the above-described problem during the starting period of writing.

Moreover, the second heating layer 48 is connected electrically with the lower magnetic pole layer 44a through a connect line 48b. Because, as described above, the lower magnetic pole layer 44a is connected electrically to the slider substrate 40, one electrode of the second heating layer 48 is accordingly grounded via the slider substrate 40. Here, the second heating layer 48 may also be isolated electrically from the lower magnetic pole layer 44a. In the case, the second heating layer 48 has two electrodes on the element-formed surface 35.

Next, the above-mentioned structure will be explained in more detail with FIG. 5b. The slider substrate 40 is made of, for example, AlTiC ($Al_2O_3$—TiC) and so on. Reference numeral 41 indicates an insulating layer with thickness of approximately 0.05 μm to 10 μm formed of, for example, $Al_2O_3$, etc., deposited on the slider substrate 40. The lower shield layer 42a is deposited on the insulating layer 41 and formed of, for example, NiFe, NiFeCo, CoFe, FeN or FeZrN, etc. with thickness of approximately 0.3 μm to 3 μm. Reference numeral 42b indicates a lower shield gap layer with thickness of approximately 0.005 μm to 0.5 μm formed of, for example, $Al_2O_3$ or DLC, etc., deposited on the lower shield layer 42a.

The MR layer 42c is made of, for example, the CIP-GMR multilayer, the CPP-GMR multilayer or the TMR multilayer. Reference numeral 42d indicates an element lead conductor layer connected to both ends of the MR layer 42c, formed of, for example, Cu, etc. and provided with a magnetic bias layer, and 42e indicates an upper shield gap layer with thickness of approximately 0.005 μm to 0.5 μm formed of, for example, $Al_2O_3$ or DLC, etc., deposited on the MR layer 42c and element lead conductor layer 42d. In the case that the MR layer 42c is made of the CPP-GMR multilayer or the TMR multilayer, the upper and lower shield gap layers 42e and 42b and the element lead conductor layer 42d become unnecessary. The upper shield layer 42f is deposited on the upper shield gap layer 42e and formed of, for example, NiFe, NiFeCo, CoFe, FeN or FeZrN, etc. with thickness of approximately 0.3 μm to 4 μm. A reproducing gap length that is the distance between the upper and lower shield layers 42f and 42a is approximately 0.03 μm to 1 μm.

Reference numeral 43 indicates a non-magnetic layer with thickness of approximately 0.1 μm to 2.0 μm formed of, for example, $Al_2O_3$, etc., deposited on the upper shield layer 42f. The lower magnetic pole layer 44a is deposited on the non-magnetic layer 43 and formed of, for example, NiFe, NiFeCo, CoFe, FeN or FeZrN, etc. with thickness of approximately 0.3 μm to 3 μm. When one magnetic layer is formed instead of the upper shield layer 42f and the lower magnetic pole layer 44a, which serves as these layers, the non-magnetic layer 43 is omitted. The connect portion 47 is continuous with the lower magnetic pole layer 44a, and formed of the same material as that of the layer 44a. Reference numeral 44b indicates a magnetic gap layer with thickness of approximately 0.03 μm to 0.5 μm (equivalent to the recording gap length), formed of, for example, $Al_2O_3$ or DLC, etc., deposited on the lower magnetic pole layer 44a. Reference numerals 44d, 44d' and 44d'' indicate coil insulating layers with thickness of approximately 0.1 μm to 5 μm, formed of, for example, a heat-cured resist and so on. The coil layer 44c and 44c' are deposited on the coil insulating layers 44d and 44d' respectively, and formed of, for example, Cu, etc. with thickness of approximately 0.5 μm to 3 μm. Reference numeral 44e indicates a coil lead conductor layer formed of, for example, Cu or NiFe, etc., electrically connected to one end of the coil layer 44c. The upper magnetic pole layer 44f is formed of, for example, NiFe, NiFeCo, CoFe, FeN or FeZrN, etc. with thickness of approximately 0.5 μm to 5 μm, acting as a magnetic pole and a magnetic yoke together with the lower magnetic pole layer 44a. Reference numeral 49 is an overcoat layer formed of, for example, $Al_2O_3$ and so on.

The first heating layer 46 is deposited on the non-magnetic layer 43 as well as the lower magnetic pole layer 44a is, and has a thickness of, for example, approximately 0.1 μm to 5 μm and is made of, for example, a material containing NiCu. The content of Ni in this NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the first heating layer 46 may also be made of a material containing NiCr. In this case, the content of Ni in this NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the first heating layer 46 may also be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less.

The second heating layer 48 is deposited on the non-magnetic layer 43 as well as the lower magnetic pole layer 44a and the first heating layer 46 are. The constituent material and the shape of the second heating layer 48 will be described later in detail.

FIG. 6 shows a cross-sectional view taken along line B-B shown in FIG. 4 illustrating a structure of the thin-film magnetic head according to the embodiment shown in FIG. 4. The elements common to FIGS. 5a and 5b are designated with the same reference numerals. In the figure, the MR layer 42c, the coil lead conductor layer 44e, the first heating layer 46 and the second heating layer 48 are not emerged on the cross-section.

Figure 7:
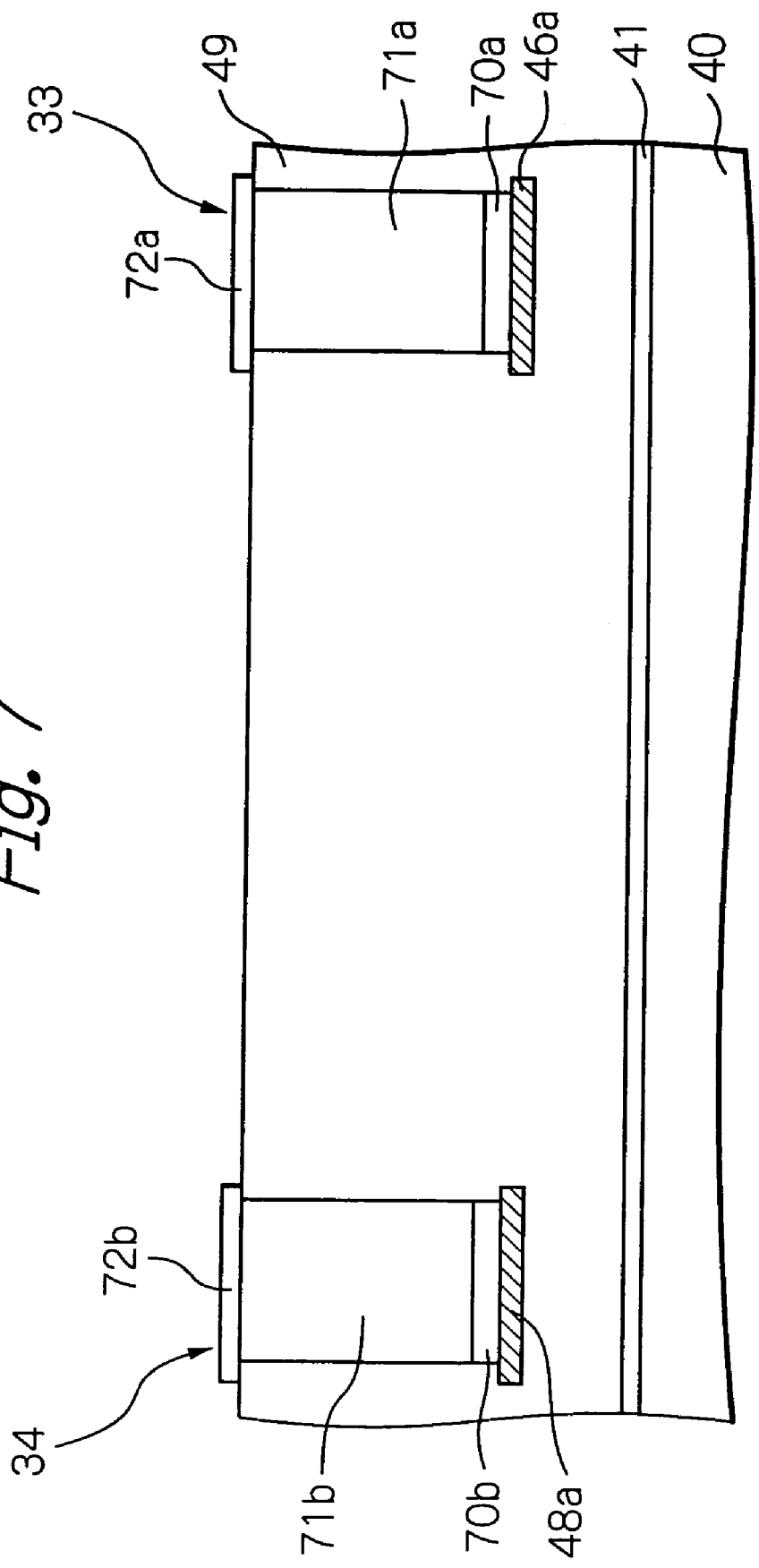
FIG. 7 shows a cross-sectional view taken along line C-C in FIG. 4 illustrating a structure of the drive electrodes for the first and second heating layers.

FIG. 7 shows a cross-sectional view taken along line C-C in FIG. 4 illustrating a structure of the drive electrodes 33 and 34 for the first and second heating layers 46 and 48.

According to FIG. 7, lead electrodes 46a and 48a extracted from the first heating layer 46 and the second heating layer 48 respectively, are emerged on the cross-section. The lead electrodes 46a and 48a are made of the same materials as those of the first and second heating layers 46 and 48 respectively. The base electrode films 70a and 70b with conductivity are formed on the lead electrodes 46a and 48a respectively. Bumps 71a and 71b extending upward which are formed by electrolytic plating using the base electrode films 70a and 70b as electrodes are provided on the base electrode films 70a and 70b respectively. The base electrode films 70a and 70b, and bumps 71a and 71b are made of a conductive material such as Cu. The thickness of the base electrode films 70a and 70b is approximately 10 nm to 200 nm and the thickness of the bumps 71a and 71b is approximately 5 μm to 30 μm.

The top ends of the bumps 71a and 71b are exposed from the overcoat layer 49, and pads 72a and 72b are provided on these top ends. These above-described elements constitute the drive electrodes 33 and 34 respectively. Currents are supplied to the first heating layer 46 and the second heating layer 48 through drive electrodes 33 and 34 respectively. Likewise, the MR read head element 42 and the inductive write head element 44 are connected to the signal electrodes 31 and 32 (FIG. 3). However, the connection structure of these elements is not shown for simplicity of drawings.

FIGS. 8a to 8e show plain views illustrating alternatives of the first heating layer also viewed through from the side of the element-formed surface of the slider substrate, and cross-sectional views taken along line A-A in FIG. 4 illustrating these alternatives.

Figure 8:
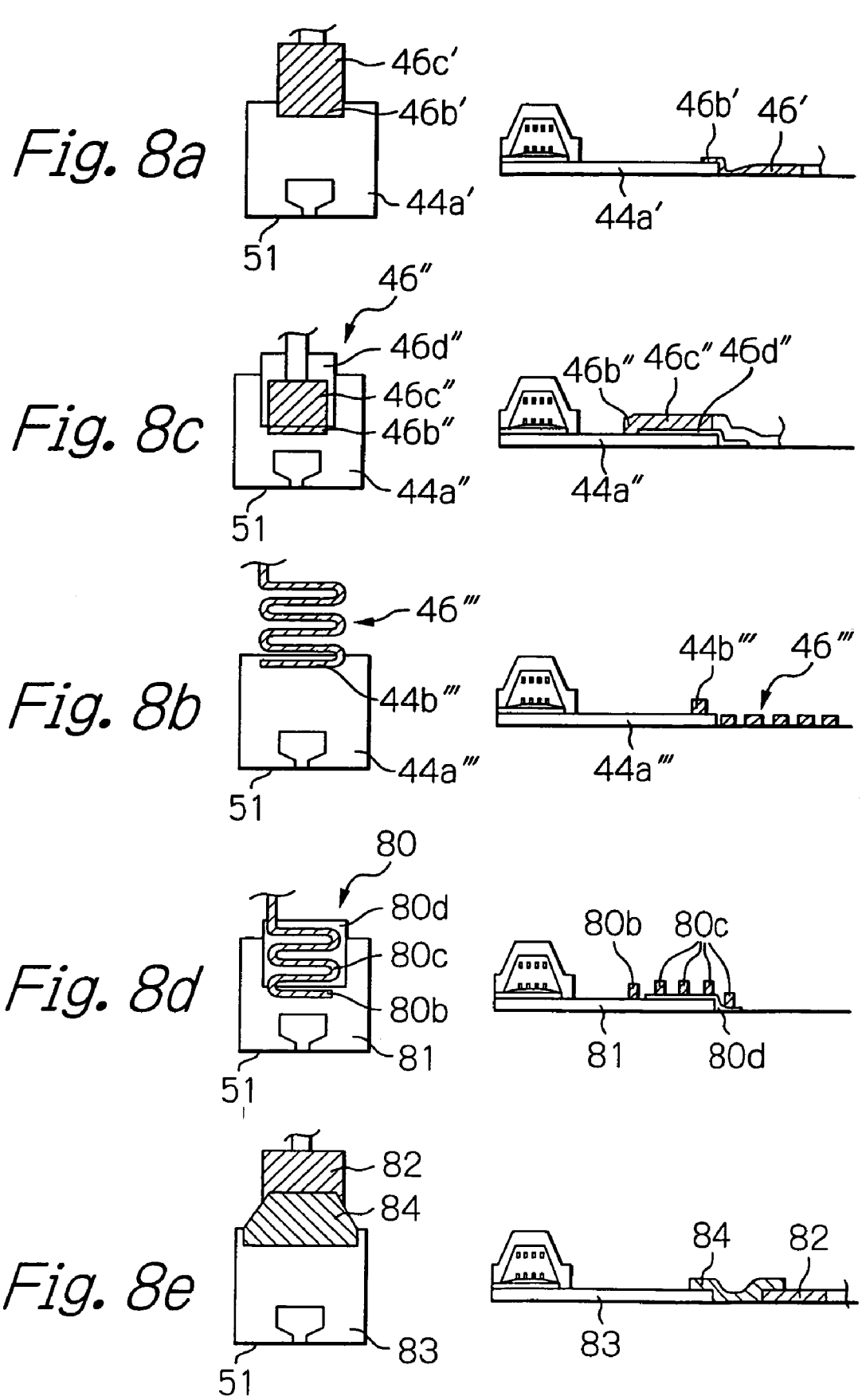
FIGS. 8a to 8e show plain views illustrating alternatives of the first heating layer also viewed through from the side of the element-formed surface of the slider substrate, and cross-sectional views taken along line A-A in FIG. 4 illustrating these alternatives.

According to FIG. 8a, an end portion 46b' of an first heating layer 46' has surface contact with an end portion of a lower magnetic pole layer 44a' by riding on the end portion of the layer 44a'. Because the thickness in the end portion 46b' is smaller than that of other portions of the first heating layer 46', the amount of the heat generated from the end portion 46b' becomes largest of other portions during flowing a current through the layer 46'. Therefore, the lower magnetic pole layer 44a' can be efficiently heated. According to FIG. 8b, the whole first heating layer 46'' is riding on a lower magnetic pole layer 44a'', that is to say, a heating portion 46c'' with monolayered form is formed on the lower magnetic pole layer 44a'' through a thin insulating layer 46d''. A connect portion 46b'' of the heating portion 46c'' is connected electrically with the lower magnetic pole layer 44a''. Because the opposed area between the heating portion 46c'' and the lower magnetic pole layer 44a'' is set to be as large as possible, an enough amount of the heat generated from the heating portion 46c'' can reach the lower magnetic pole layer 44a'' by sufficiently reducing the thickness of the insulating layer 46d'' within the range of insulating characteristic. As an alternative of the just-described mode, a part of the first heating layer 46'' may be riding on the lower magnetic pole layer 44a''.

According to FIG. 8c, a first heating layer 46''' has a meandering-line shape, and a connect portion 46b''' as the end portion of the meandering-line shape has surface contact with an end portion of a lower magnetic pole layer 44a''' by riding on the end portion of the layer 44a'''. According to FIG. 8d, the whole first heating layer 80 is riding on a lower magnetic pole layer 81, that is to say, a heating portion 80c with a meandering-line shape is formed on the lower magnetic pole layer 81 through a thin insulating layer 80d. A connect portion 80b of the heating portion 80c is connected electrically with the lower magnetic pole layer 81. By sufficiently reducing the thickness of the insulating layer 80d within the range of insulating characteristic, an enough amount of the heat generated from the heating portion 80c can reach the lower magnetic pole layer 81. As an alternative of the just-described mode, a part of the first heating layer 80 may be riding on the lower magnetic pole layer 81.

According to FIG. 8e, a first heating layer 82 and a lower magnetic pole layer 83 which are separately placed from each other, are connected through a thermal conductive layer 84 made of a material with high thermal conductivity such as a metal. Therefore, an enough amount of the heat generated from the first heating layer 82 can reach the lower magnetic pole layer 83. The first heating layer 82 can have a monolayered shape or a meandering-line shape. When the thermal conductive layer 84 also has electrical conductivity, the first heating layer 82 is also electrically connected with the lower magnetic pole layer 83. The number of the thermal conductive layer is not limited to one, that is, two or more thermal conductive layers can be provided under the condition that they surely connect thermally between the first heating layer 82 and the lower magnetic pole layer 83 which are separately placed from each other.

In each case shown in FIGS. 8a to 8e, because the heat generated from the first heating layer reaches the lower magnetic pole layer directly or through the thermal conductive layer with high efficiency, the protrusion response of the inductive write head element due to the heating becomes fast, or the same level as the protrusion response due to the heat generated from the coil layer, that is, the original protrusion of TPTP phenomenon. Moreover, because the size and the shape of the first heating layer have no specific restrictions, there is a lot of flexibility in the design of the layer's electric resistance, and the heating performance can be easily optimized.

In FIGS. 8a to 8e, the first heating layer is provided in the position such that the layer has surface contact with, or lies adjacent to the end portion opposite to the head end surface 51 of the lower magnetic pole layer. However the position is not necessarily limited to the mode. The first heating layer may be provided in the position such that the layer has surface contact with, or lies adjacent to other end portion of the lower magnetic pole layer.

Furthermore, the first heating layer may have other shapes as alternatives where the heat generated from the first heating layer reaches the lower magnetic pole layer directly or through the thermal conductive layer with high efficiency.

Figure 9:
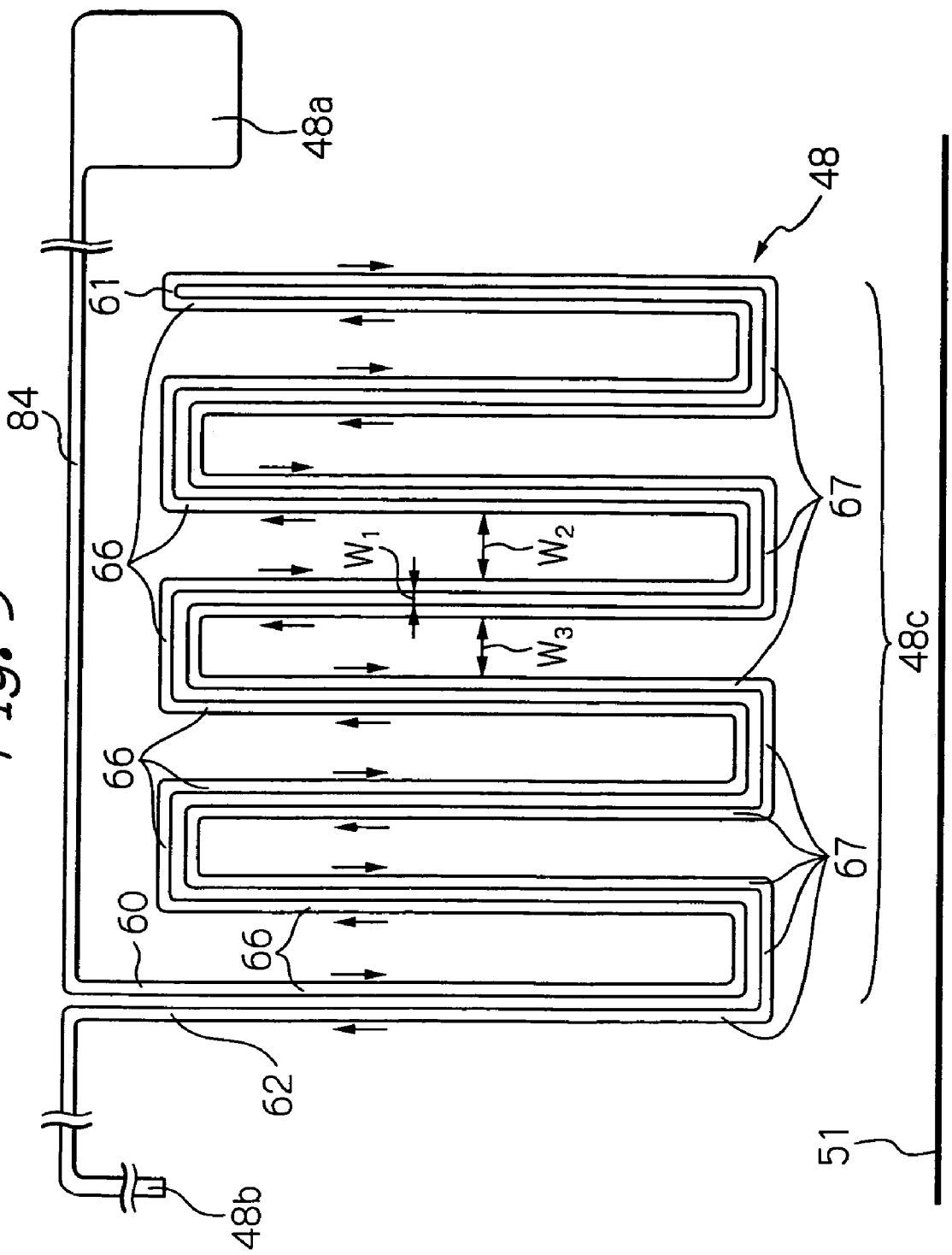
FIG. 9 shows a plain view illustrating a structure of the second heating layer of the thin-film magnetic head according to the embodiment in FIG. 4.

FIG. 9 shows a plain view illustrating a structure of the second heating layer 48 of the thin-film magnetic head according to the embodiment in FIG. 4.

According to FIG. 9, the second heating layer 48 includes a heating portion 48c that consists of one line meandering in layer, and the lead electrode 48a and the connect portion 48b which are respectively connected to both ends of the heating portion 48c, constituting a current path of a predetermined length.

More specifically, the heating portion 48c consists of an up-line section 66 formed so as to meander in a square wave form from a predetermined starting point 60 to a turn-round 61, a down-line section 67 formed so as to return from the turn-round 61 to an end point 62 close to the starting point 60 meandering along the up-line section 66, a connection section 84 that connects the starting point 60 and the lead electrode 48a, and the connect portion 48b that connects the end point 62 to the lower magnetic pole layer or the drive electrode. The distance $W_1$ between the up-line section 66 and the down-line section 67 formed so as to run along each other is set to be narrower than the distance $W_2$ between the mutually facing parts of the up-line section 66 and the distance $W_3$ between the mutually facing parts of the down-line section 67.

The heating portion 48c has a thickness of, for example, approximately 100 nm to 5000 nm and is made of, for example, a material containing NiCu. The content of Ni in this NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the heating portion 48c may also be made of a material containing NiCr. In this case, the content of Ni in this NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heating portion 48c may also be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less. In addition, the lead electrode 48a and the connect portion 48b may also be made of the same material as that of the heating portion 48c.

FIGS. 10a to 10d show cross-sectional views taken along line A-A in FIG. 4 explaining the manufacturing process of the thin-film magnetic head according to the embodiment shown in FIG. 4.

Figure 10A:
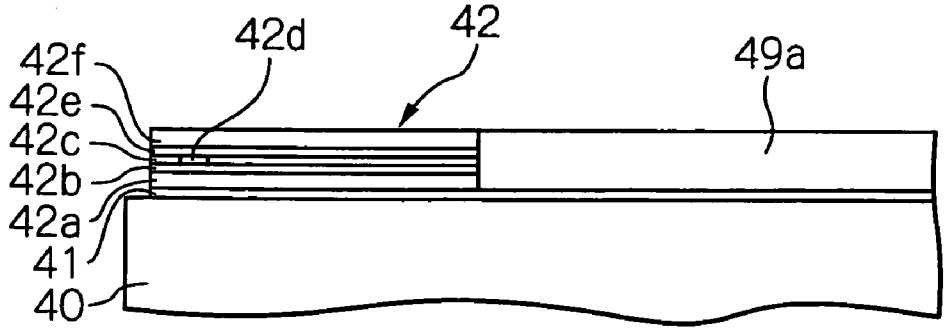
FIGS. 10a to 10d show cross-sectional views taken along line A-A in FIG. 4 explaining the manufacturing process of the thin-film magnetic head according to the embodiment shown in FIG. 4.

Hereinafter, the manufacturing process of the thin-film magnetic head according to the embodiment will be explained briefly with reference to the figures. First, as shown in FIG. 10a, an insulating layer 41 is deposited on the substrate 40 using, for example, a sputtering technique. Next, the lower shield layer 42a is formed on the insulating layer 41 using, for example, a plating technique, and then, the lower shield gap layer 42b, the MR layer 42c, the element lead conductor layer 42d, and the upper shield gap layer 42e are formed sequentially using, for example, a sputtering technique. Then, the upper shield layer 42f is formed using, for example, a plating technique. Then, a planarizing layer 49a is formed behind these stacked layers viewed through from the head end surface 51 side. The formation of the MR read head element 42 is completed through the above-described process.

Figure 10B:
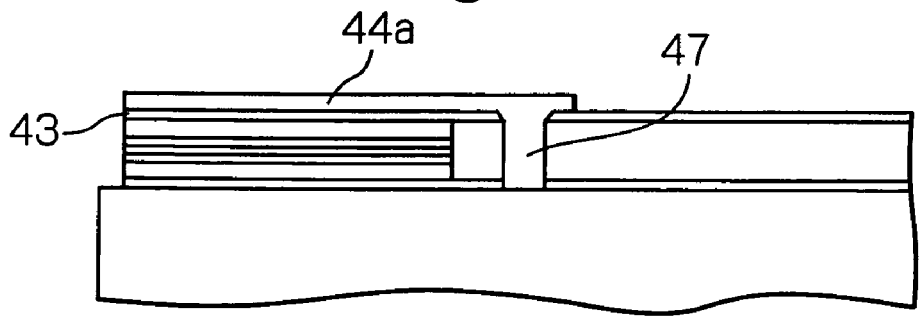

Next, as shown in FIG. 10b, the non-magnetic layer 43 is deposited on the upper shield layer 42f using, for example, a sputtering technique. Then, the lower magnetic pole layer 44a and the connect portion 47 are formed using common techniques such as a sputtering technique, a photolithographic method and a dry-etching method.

Figure 10C:
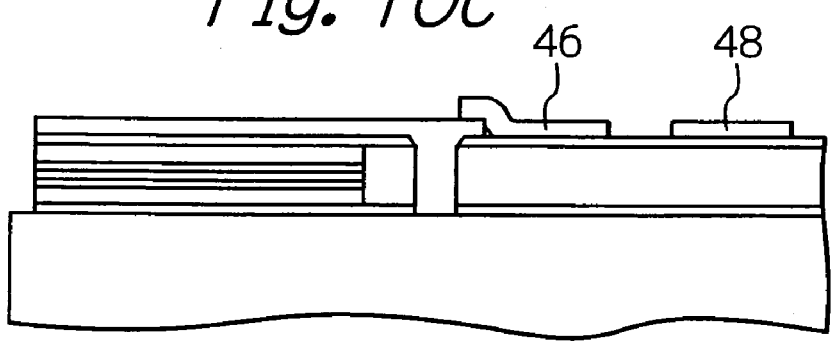

Next, as shown in FIG. 10c, the first heating layer 46 and the second heating layer 48 are formed on the non-magnetic layer 43 using common techniques such as a sputtering technique, a photolithographic method and a dry-etching method.

Figure 10D:
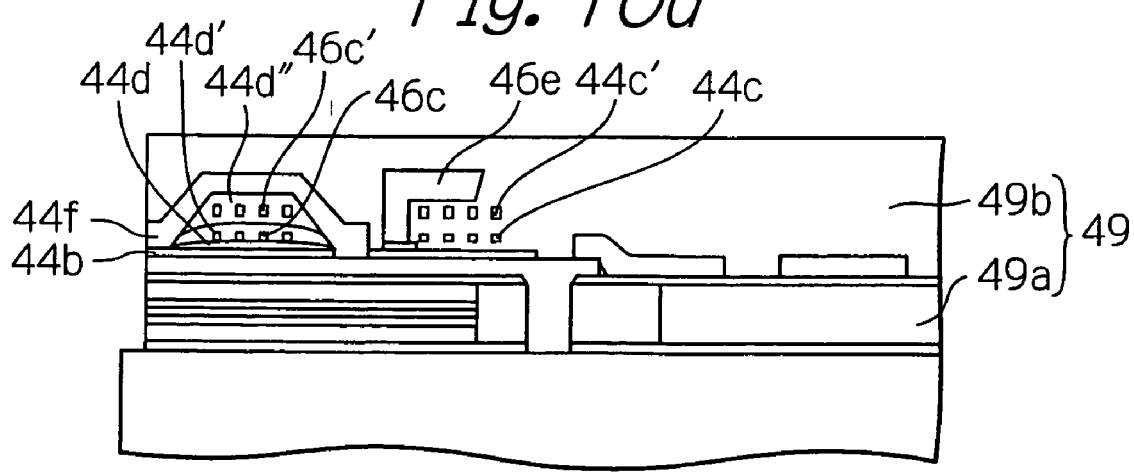

Next, as shown in FIG. 10d, the magnetic gap layer 44b is formed on the lower magnetic pole layer 44a using, for example, a sputtering technique. Further, by using common techniques such as a photolithographic method and a dry-etching method, the coil insulating layer 44d, the coil layer 44c, the coil insulating layer 44d', the coil layer 44c' and the coil insulating layer 44d'' are formed sequentially on the magnetic gap layer 44b. And then, the upper magnetic pole layer 44f is formed so as to cover these layers. The formation of the inductive write head element 44 is completed through the above-described process. After the formation, the overcoat layer 49b is formed so as to cover the head elements.

FIG. 11 shows a block diagram illustrating the circuit structure of the recording/reproducing circuit 13 of the magnetic disk drive apparatus according to the embodiment in shown FIG. 1.

In FIG. 11, reference numeral 90 indicates a recording/reproducing control CPU, 91 indicates a recording/reproducing channel, 92 indicates a preamplifier, 93 indicates a register, 940 and 941 indicate D/A converters, 95 indicates a heating layer control circuit, and 960 and 961 indicate a current buffer, respectively.

The recording data that is output from the recording/reproducing channel 91 is supplied to the preamplifier 92. The recording/reproducing channel 91 supplies recording data to the preamplifier 92 only when a recording control signal that is output from the recording/reproducing control CPU 90 instructs a write operation. The preamplifier 92 passes a write current through the coil layer 44c corresponding to this recording data, and the inductive write head element 44 writes data on the magnetic disk 10 (FIG. 1).

A constant current flows through the MR layer 42c only when the reproduction control signal that is output from the recording/reproducing control CPU 90 instructs a read operation. The signal reproduced by this MR read head element 42 is amplified and demodulated by the preamplifier 92, and then, the obtained reproduced data is output to the recording/reproducing channel 91.

The control unit 95 receives a first heating layer ON/OFF signal, a second heating layer ON/OFF signal, a first-heating-layer current control signal that is output from the recording/reproducing control CPU 90 through the register 93 and the D/A converter 940, and a second-heating-layer current control signal that is output from the recording/reproducing control CPU 90 through the register 93 and the D/A converter 941. When the respective first and second heating layer ON/OFF signals are an ON operation instruction, currents flow through the first and second heating layers 46 and 48 through the current buffers 960 and 961 respectively. The current values in these cases are controlled to values corresponding to the first-heating-layer current control signal and second-heating-layer current control signal respectively.

Thus, it is possible to utilize more diversified current application modes and to realize more appropriate controls of the magnetic spacing $d_{MS}$ by providing the system of the first and second heating layer ON/OFF signals and the first-heating-layer current control signal and the second-heating-layer current control signal, independently from the recording/reproducing control signal system.

In the actual operation, a current corresponding to a predetermined current application mode considering the timing of write and read operations, flows through the first and second heating layers 46 and 48. Heats are generated from the first and second heating layers 46 and 48 by these currents and expand thermally the MR read head element 42 and the inductive write head element 44. This allows the magnetic spacing $d_{MS}$ to be reduced prior to write and read operations and set to the predetermined value just before the writing, as described later in detail. Thus, the controlling of the magnetic spacing $d_{MS}$ only when necessary in the operation period of the magnetic head elements makes it possible to obtain the desired $d_{MS}$ value without considerably increasing the probability that the slider may crash into the magnetic disk surface. The $d_{MS}$ value can be adjusted precisely by using the first-heating-layer current control signal and the second-heating-layer current control signal.

It is obvious that the circuit structure of the recording/reproducing circuit 13 is not limited to that shown in FIG. 10. It is also possible to specify the write and read operations using a signal other than the recording/reproducing control signal. Furthermore, it is also possible to use not only DC but also AC or pulse current, etc., as the currents flowing through the first and second heating layers.

Hereinafter, the method for controlling the magnetic spacing $d_{MS}$ during writing data by using the first and second heating layers will be explained.

Figure 12:
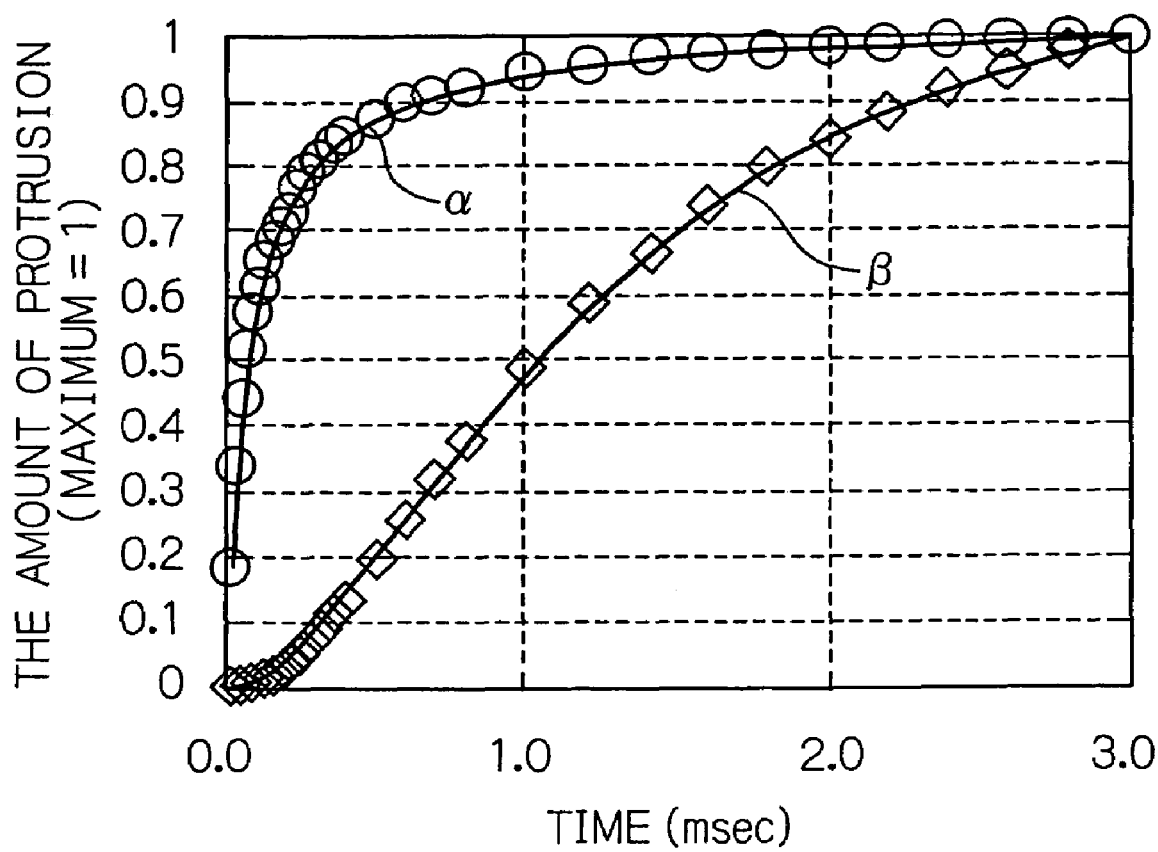
FIG. 12 shows a graph illustrating a time change of the amount of the protrusion of the lower magnetic pole layer by the respective heats generated from the first and second heating layers.
Figure 13:
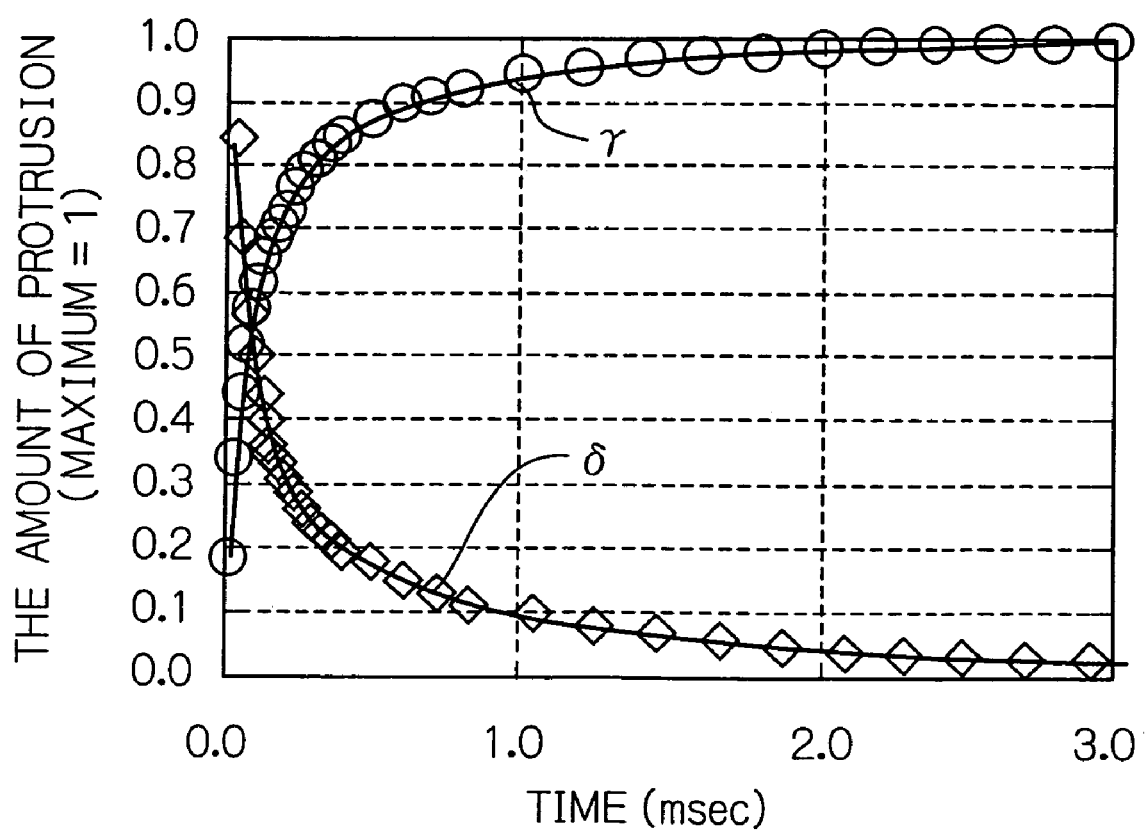
FIG. 13 shows a graph illustrating a time change of the amount of the respective protrusions of the lower magnetic pole layer after the beginning of the current application into the first heating layer and after the end of the current application.

FIG. 12 shows a graph illustrating a time change of the amount of the protrusion of the lower magnetic pole layer by the respective heats generated from the first and second heating layers. FIG. 13 shows a graph illustrating a time change of the amount of the respective protrusions of the lower magnetic pole layer after the beginning of the current application into the first heating layer and after the end of the current application. In these figures, the horizontal axis is a time that the beginning or the end of supplying the electric power to the respective heating layers is set to the origin point t=0, and the vertical axis is the amount of the protrusion that the maximum amount of the protrusion of the lower magnetic pole layer is set to 1. Here, a time constant during ON operation of the respective heating layers is defined as a time needed for the amount of the protrusion of the lower magnetic pole layer to reach 70% of the maximum amount, and a time constant during OFF operation of the respective heating layers is defined as a time needed for the amount of the protrusion of the lower magnetic pole layer to be reduced to 30% of the maximum amount. The amount of the protrusion is obtained by simulation.

According to FIG. 12, the protrusion response of the lower magnetic pole layer due to the heat generated from the first heating layer, which is corresponding to the slope of a curve $\alpha$, becomes faster than the protrusion response due to the heat generated from the second heating layer, which is corresponding to the slope of a curve $\beta$. In the case, a time constant during ON operation of the first heating layer is 0.2 msec. This time constant is about one order of magnitude smaller than the time constant of the second heating layer of 1.4 msec, and almost equals to a time constant of the coil layer of the inductive write head element of 0.2 to 0.3 msec. Therefore, the protrusion of the inductive write head element with the equivalent response to that of the original TPTP can be obtained by using the first heating layer.

According to FIG. 13, a time constant during OFF operation (a curve $\delta$) of the first heating layer is 0.2 msec that is almost the same value as the time constant during ON operation (a curve $\gamma$). That is to say, it is understood that the change in the protrusion of the lower magnetic pole layer due to the heat generated from the first heating layer proceeds at almost the same rate in both cases of the protrusion and the reversion. Therefore, by starting the protrusion due to the heat generated from the coil layer at the same time as the end of heating by using the first heating layer, the amount of the protrusion of the lower magnetic pole layer can be held constant under the balance of both influences of the heats from the first heating layer and the coil layer.

However, because the first heating layer is also adjacent to the MR read head element, the influence on the MR read head element of the heat generated from the first heating layer must be considered in controlling the magnetic spacing $d_{MS}$.

Figure 14:
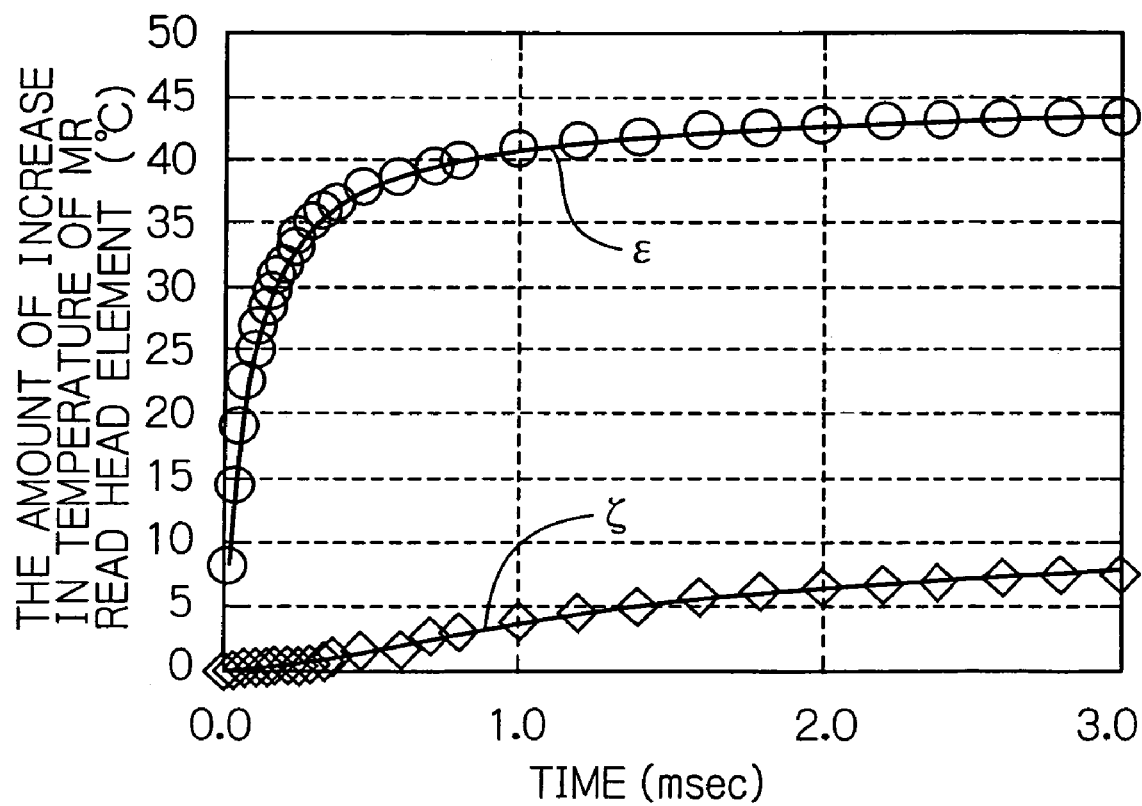
FIG. 14 shows a graph of time change in the amount of the increase in temperature of the MR read head element due to the respective heats generated from the first and second heating layers.

FIG. 14 shows a graph of time change in the amount of the increase in temperature of the MR read head element due to the respective heats generated from the first and second heating layers. In the figure, the horizontal axis is a time that the beginning of supplying the electric power to the respective heating layers is set to the origin point t=0, and the vertical axis is the amount of the increase in temperature of the MR read head element due to the respective heating layers.

According to the figure, in the case that the first heating layer generates the heat (curve $\epsilon$), the temperature of the MR read head element increases more rapidly than that in the case of using the second heating layer (curve $\zeta$). The amount of the temperature increase by the heat generated from the first heating layer reaches 43° C. at 3.0 msec of time when the amount of the protrusion reaches almost the maximum in both cases of using the first and second heating layers. The amount of 43° C. is larger by approximately 35° C. than the amount of temperature increase in the case of using the second heating layer. If the MR read head element repeatedly suffered such a higher temperature, the element's life would be shortened. Therefore, it is understood that the second heating layer is preferably used for constantly controlling the magnetic spacing $d_{MS}$.

Hereinafter, the control method of the magnetic spacing $d_{MS}$, exploiting the characteristics of the first and second heating layers shown in FIGS. 12 to 14, will be explained.

FIGS. 15a to 15d show time-charts explaining an embodiment of the method for controlling the magnetic spacing $d_{MS}$ according to the present invention.

First, the relation between an electric power for writing applied to the inductive write head element and the change in the magnetic spacing $d_{MS}$ due to the power application is shown in FIG. 5a. A writing power starts to be applied to the inductive write head element at time t=0, and then, a predetermined current flows through the coil layer, and the inductive write head element protrudes toward the magnetic disk surface due to the TPTP phenomenon. Corresponding to the protrusion, the magnetic spacing $d_{MS}$ starts to decrease from the initial value $d_0$, and reaches the setting value $d_1$ at the response time $t_R$, just then, becomes stable to be in thermal equilibrium state.

Figure 15A:
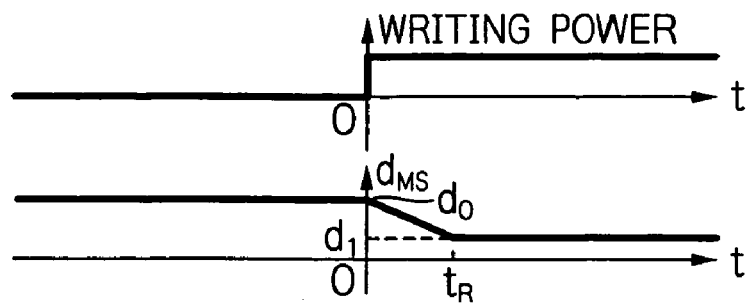
FIGS. 15a to 15d show time-charts explaining an embodiment of the method for controlling the magnetic spacing $d_{MS}$ according to the present invention.
Figure 15B:
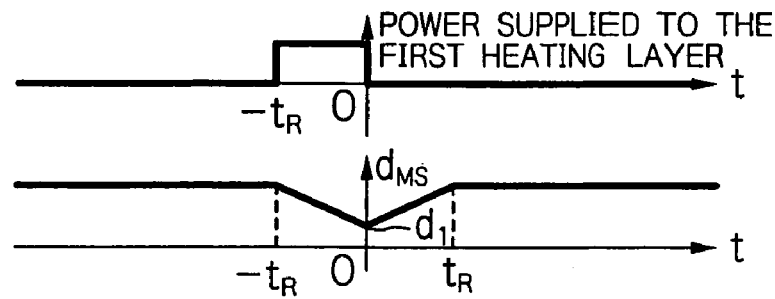

Next, the relation between an electric power applied to the first heating layer and the change in the magnetic spacing $d_{MS}$ due to the heat generated from the first heating layer is shown in FIG. 15b. A power comparable to the writing power starts to be applied to the first heating layer at time t=$-t_R$, and then, a predetermined current flows through the first heating layer, and, corresponding to the protrusion of the lower magnetic pole layer by the heat generated from the first heating layer, the magnetic spacing $d_{MS}$ starts to decrease from the initial value $d_0$. In this case, the protrusion responses due to the heats generated from the first heating layer and the coil layer becomes almost equal to each other, as explained in FIG. 12, because the applied powers have the same level as each other. Consequently, the magnetic spacing $d_{MS}$ reaches almost the setting value $d_1$, at time t=0. Then, just after finishing the power supply to the first heating layer at time t=0, the magnetic spacing $d_{MS}$ is increased by the contraction of the inductive write head element due to the heat dissipation. And then, the magnetic spacing $d_{MS}$ is returned to the initial value $d_0$ at time t=$t_R$ because the response during OFF operation is almost the same as the response during ON operation, as explained in FIG. 13.

Figure 15C:
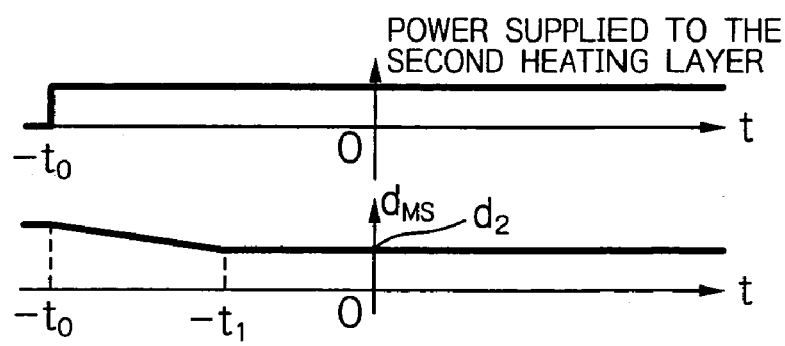

Next, the relation between an electric power applied to the second heating layer and the change in the magnetic spacing $d_{MS}$ due to the heat generated from the second heating layer is shown in FIG. 15c. A predetermined power starts to be applied to the second heating layer at time t=$-t_0$, and then, a predetermined current flows through the second heating layer, and, corresponding to the protrusion of the lower magnetic pole layer by the heat generated from the second heating layer, the magnetic spacing $d_{MS}$ starts to decrease from the initial value $d_0$. Then, just after the magnetic spacing $d_{MS}$ reaches the setting value $d_2$ at time t=$-t_1$, the magnetic spacing $d_{MS}$ becomes stable to be in thermal equilibrium state. Here, the $t_0$ and the $t_1$ have enough larger positive values than the $t_R$ value. Further, the $d_2$ is larger than the $d_1$.

On the basis of the above-mentioned relations between the change in the magnetic spacing $d_{MS}$ and the electric power supplied to the respective first and second heating layers and inductive write head element, the appropriate method for controlling the magnetic spacing $d_{MS}$ during the starting period of writing will be explained below.

Figure 15D:
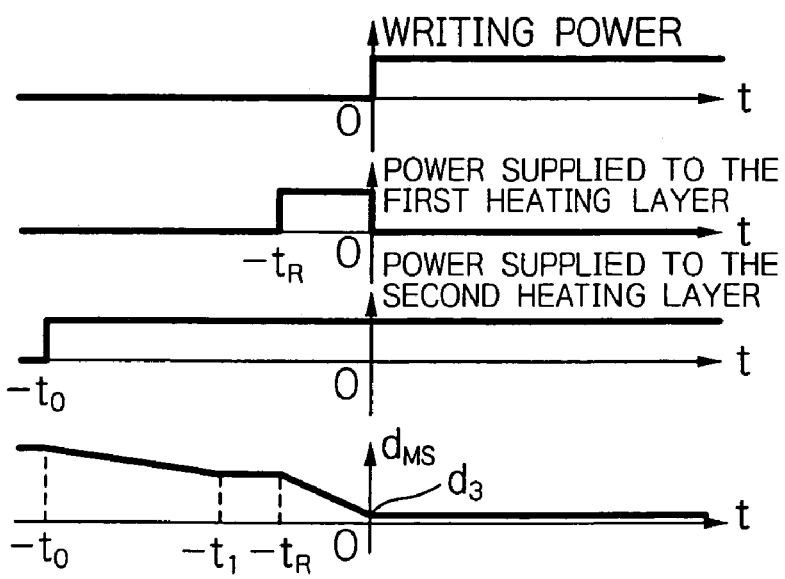

As shown in FIG. 15d, the power starts to be applied to the second heating layer at time t=$-t_0$. Further, the power starts to be applied to the first heating layer at time t=$-t_R$, and then, the latter power supply is finished at time t=0, and simultaneously, the writing power is applied to start the write operation. These steps of applying the powers cause the magnetic spacing $d_{MS}$ to behave as the superposition of the respective behaviors shown in FIGS. 15a, 15b and 15c. That is to say, basing the magnetic spacing $d_{MS}$ on the value $d_2$ stable due to the continuing heat generated from the second heating layer, the magnetic spacing $d_{MS}$ shows a setting value $d_3$ stably just after time t=0 or the start of writing. Therefore, understandably, these steps resolve the deficiency in the writing performance during the starting period of writing. Here, the value $d_3$ can be calculated from the sum of the respective amounts of decreases in the magnetic spacing $d_{MS}$ by using the first and second heating layers, that is, $d_3=d_0-(d_0-d_1)-(d_0-d_2)=d_1+d_2-d_0$.

As described above, this control method of stabilizing magnetic spacing $d_{MS}$ during the starting period of writing can be realized only when the protrusion response due to the heat generated from the first heating layer is set to the same level as the protrusion response due to the heat generated from the coil layer. Therefore, it is understood that the problem of the deficiency in the writing performance during the starting period of writing, which could not have been avoided by means of the conventional art, can be solved by controlling the magnetic spacing $d_{MS}$ with the use of the thin-film magnetic head according to the present invention.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A control method of a magnetic spacing during write operation in magnetic recording, comprising:
    beginning to apply a current to at least one first heating element at a time advanced by a predetermined period from the start of writing data, the at least one first heating element being contacted with a magnetic pole layer included by at least one write head element, or the at least one first heating element being connected with said magnetic pole layer through at least one thermal conductive layer, the current being applied to protrude said at least one write head element due to thermal expansion; and
    finishing applying said current at said start of writing data to maintain a constant value of a magnetic spacing after said start of writing data,
    wherein an electric power supplied to said at least one first heating element has a same level as an electric power supplied to a coil layer included in said at least one write head element during writing data, and said predetermined period is equivalent to a time period between said start of the writing data at which said electric power begins to be supplied to said coil layer and a time at which said magnetic spacing just reaches said constant value.

2. The control method as claimed in claim 1, wherein said at least one first heating element is provided in a position opposite to an air bearing surface in relation to said magnetic pole layer.

3. The control method as claimed in claim 1, wherein said magnetic pole layer is a lower magnetic pole layer.

4. The control method as claimed in claim 1, wherein said method further comprises:

applying a current in advance of writing or reading data to at least one second heating element that is positioned opposite to an air bearing surface in relation to said at least one write head element, and through an interposition of an insulating layer provided between said at least one second heating element and said at least one write head element.

5. The control method as claimed in claim 4, wherein said at least one first heating element and/or said at least one second heating element is connected to said magnetic pole layer electrically, and said magnetic pole layer is grounded.

* * * * *